(12) United States Patent
Dick et al.

(10) Patent No.: US 7,904,107 B2
(45) Date of Patent: *Mar. 8, 2011

(54) METHOD AND APPARATUS FOR PROVIDING BIASING CRITERIA FOR BINARY DECISIONS FOR USE IN WIRELESS COMMUNICATIONS TO ENHANCE PROTECTION

(75) Inventors: Stephen G. Dick, Nesconset, NY (US); Younglok Kim, Seoul (KR); Nader Bolourchi, Larchmont, NY (US); Sung-Hyuk Shin, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/133,019

(22) Filed: Jun. 4, 2008

(65) Prior Publication Data
US 2008/0273469 A1 Nov. 6, 2008

Related U.S. Application Data

(63) Continuation of application No. 10/369,836, filed on Feb. 19, 2003, now Pat. No. 7,428,425.

(60) Provisional application No. 60/357,947, filed on Feb. 19, 2002.

(51) Int. Cl.
*H04B 7/00* (2006.01)
(52) U.S. Cl. ......... 455/522; 455/69; 455/135; 455/226.3
(58) Field of Classification Search ............ 455/522, 455/67.17, 68–70, 115.2, 115.3, 126, 134, 455/135, 161.3, 197.1, 283, 226.2, 226.3, 277.2, 77, 211; 370/333, 496, 524
See application file for complete search history.

(56) References Cited

U.S. PATENT DOCUMENTS

| | | | |
|---|---|---|---|
| 5,003,457 A | | 3/1991 | Ikei et al. |
| 5,245,629 A | * | 9/1993 | Hall .............. 455/522 |
| 5,386,589 A | | 1/1995 | Kanai |
| 5,636,230 A | | 6/1997 | Marturano et al. |
| 5,828,677 A | | 10/1998 | Sayeed et al. |
| 6,219,559 B1 | | 4/2001 | Hill et al. |
| 6,308,294 B1 | | 10/2001 | Ghosh et al. |

(Continued)

FOREIGN PATENT DOCUMENTS

CN 1294827 2/2000

(Continued)

OTHER PUBLICATIONS

3GPP, "3$^{rd}$ Generation Partnership Project; Technical Specification Group Radio Access Network; Multiplexing and channel coding (TDD) (Release 5)," 3GPP TS 25.222 V5.2.0 (Sep. 2002).

(Continued)

*Primary Examiner* — Dominic E Rego
(74) *Attorney, Agent, or Firm* — Volpe and Koenig, P.C.

(57) ABSTRACT

A criterion for biasing a binary decision requiring an unequal protection which utilizes a measured signal to interference ratio (SIR). The SIR may be derived from a determination of channel estimation. The SIR is compared against a threshold, the threshold being selected to bias the decision toward a not acknowledge (NACK) as opposed to an acknowledge (ACK) determination. The technique is advantageous for providing biased binary decisions for high speed downlink packets (HSDP) but may be utilized for both uplink and downlink applications.

13 Claims, 1 Drawing Sheet

U.S. PATENT DOCUMENTS

| | | | |
|---|---|---|---|
| 6,542,718 B1* | 4/2003 | Kuo et al. | 455/69 |
| 6,574,211 B2 | 6/2003 | Padovani et al. | |
| 6,735,449 B2 | 5/2004 | Tran | |
| 6,950,830 B2 | 9/2005 | Obradovic et al. | |
| 2001/0051530 A1* | 12/2001 | Shiotsu et al. | 455/522 |
| 2002/0018446 A1 | 2/2002 | Huh et al. | |
| 2002/0042283 A1* | 4/2002 | Moulsley | 455/517 |
| 2002/0081977 A1 | 6/2002 | McCune, Jr. | |
| 2003/0021243 A1* | 1/2003 | Hamalainen | 370/329 |
| 2003/0039227 A1 | 2/2003 | Kwak | |
| 2003/0063587 A1 | 4/2003 | Cho et al. | |
| 2003/0095511 A1 | 5/2003 | Muraoka | |
| 2003/0118057 A1 | 6/2003 | Ushirokawa et al. | |
| 2004/0133837 A1 | 7/2004 | Varma et al. | |

FOREIGN PATENT DOCUMENTS

| | | |
|---|---|---|
| CN | 1318233 | 10/2001 |
| CN | 1381997 | 11/2002 |
| EP | 0 961 417 | 12/1999 |
| EP | 1 143 757 | 10/2001 |
| EP | 1 168 703 | 1/2002 |
| JP | 11-243363 | 9/1999 |
| WO | 97/08847 | 3/1997 |
| WO | 00/21236 | 4/2000 |
| WO | 00/21326 | 4/2000 |

OTHER PUBLICATIONS

3GPP, "3$^{rd}$ Generation Partnership Project; Technical Specification Group Radio Access Network; Multiplexing and channel coding (TDD) (Release 1999)," 3GPP TS 25.222 V3.7.0 (Sep. 2001).

3GPP, "3$^{rd}$ Generation Partnership Project; Technical Specification Group Radio Access Network; Multiplexing and channel coding (TDD) (Release 5)," 3GPP TS 25.222 V5.3.0 (Dec. 2002).

3GPP, "3$^{rd}$ Generation Partnership Project; Technical Specification Group Radio Access Network; Multiplexing and channel coding (TDD) (Release 4)," 3GPP TS 25.222 V4.6.0 (Dec. 2002).

3GPP, "3$^{rd}$ Generation Partnership Project; Technical Specification Group Radio Access Network; Multiplexing and channel coding (TDD) (Release 4)," 3GPP TS 25.222 V4.2.0 (Dec. 2001).

3GPP, "3$^{rd}$ Generation Partnership Project; Technical Specification Group Radio Access Network; Multiplexing and channel coding (TDD) (Release 1999)," 3GPP TS 25.222 V3.10.0 (Sep. 2002).

3GPP, "3$^{rd}$ Generation Partnership Project; Technical Specification Group Radio Access Network; Physical Layer Procedures (FDD) (Release 4)." 3GPP TS 25.214 v4.5.0 (Sep. 2002).

3GPP, "3$^{rd}$ Generation Partnership Project; Technical Specification Group Radio Access Network; Physical Layer Procedures (FDD) (Release 5)." 3GPP TS 25.214 v5.3.0 (Dec. 2002).

3GPP, "3$^{rd}$ Generation Partnership Project; Technical Specification Group Radio Access Network; Physical Layer Procedures (FDD) (Release 4)." 3GPP TS 25.214 v4.3.0 (Dec. 2001).

3GPP, "3$^{rd}$ Generation Partnership Project; Technical Specification Group Radio Access Network; Physical Layer Procedures (FDD) (Release 1999)." 3GPP TS 25.214 v3.11.0 (Sep. 2002).

3GPP, "3$^{rd}$ Generation Partnership Project; Technical Specification Group Radio Access Network; Physical Layer Procedures (FDD) (Release 1999)." 3GPP TS 25.214 v3.9.0 (Dec. 2001).

3GPP, "3$^{rd}$ Generation Partnership Project; Technical Specification Group Radio Access Network; Physical Channels and Mapping of Transport Channels onto Physical Channels (FDD) (Release 5)," 3GPP TS 25.211 V5.3.0 (Dec. 2002).

3GPP, "3$^{rd}$ Generation Partnership Project; Technical Specification Group Radio Access Network; Physical Channels and Mapping of Transport Channels onto Physical Channels (FDD) (Release 4)," 3GPP TS 25.211 V4.6.0 (Sep. 2002).

3GPP, "3$^{rd}$ Generation Partnership Project; Technical Specification Group Radio Access Network; Physical Channels and Mapping of Transport Channels onto Physical Channels (FDD) (Release 4)," 3GPP TS 25.211 V4.3.0 (Dec. 2001).

3GPP, "3$^{rd}$ Generation Partnership Project; Technical Specification Group Radio Access Network; Physical Channels and Mapping of Transport Channels onto Physical Channels (FDD) (Release 1999)," 3GPP TS 25.211 V3.12.0 (Sep. 2002).

3GPP, "3$^{rd}$ Generation Partnership Project; Technical Specification Group Radio Access Network; Physical Channels and Mapping of Transport Channels onto Physical Channels (FDD) (Release 1999)," 3GPP TS 25.211 V3.9.0 (Dec. 2001).

Ericcson, "Channelization code allocation for RACH message part," TSG-RAN Working Group 1 Meeting #6, TSGR1#6(99)903 (Jul. 13-16, 1999).

Grant et al., "Multiuser Channel Estimation for Detection of Cochannel Signals," (1998).

Li, "Simplified Channel Estimation for OFDM Systems with Multiple Transmit Antennas," IEEE Transactions on Wireless Communications, pp. 67-75, (Jan. 2002).

Pukkila, "Channel Estimation Modeling," S-72.333 Postgraduate Course in Radiocommunications (2000).

Rangaraj et al., "Improved Channel Estimation for OFDM Based WLAN Systems," Proceedings of the International Conference on Wireless Communications Networks ICWCN-2003, (Jun. 2003).

* cited by examiner

METHOD AND APPARATUS FOR PROVIDING BIASING CRITERIA FOR BINARY DECISIONS FOR USE IN WIRELESS COMMUNICATIONS TO ENHANCE PROTECTION

CROSS REFERENCE TO RELATED APPLICATIONS

This application is a continuation of U.S. patent application Ser. No. 10/369,836, filed Feb. 19, 2003, which claims the benefit of U.S. Provisional Application Ser. No. 60/357,947, filed Feb. 19, 2002, which is incorporated by reference as if fully set forth.

FIELD OF INVENTION

This application is related to wireless communications. More particularly the present invention relates to providing biased binary decisions for high speed downlink packets (HSDP).

BACKGROUND

In HSDP Access (HSDPA), as well as many other communication systems, there are applications where a binary decision is required but wherein the penalty of error is unequal as between the two decisions.

For example, HSDPA uses an acknowledge/not acknowledge (ACK/NACK) signal where the user equipment (UE) indicates whether or not a transmitted block of data has been successfully decoded. It has been recognized that it is more injurious to system performance for a NACK message to be incorrectly interpreted as an ACK than for an ACK message to be incorrectly decoded as a NACK. In the latter case, the error would result in a transmission block being unnecessarily retransmitted; which amounts to only a small loss in efficiency. In the former case, the transmitting side would assume success for the previously transmitted block, and would not resend it. This is a catastrophic failure, causing serious system disruption.

Several obvious techniques have been recognized to bias the answer in favor of identifying the condition with the NACK. For example, in normal coherent demodulation of binary phase shift keying (BPSK), the output signal is often normalized, e.g., an ideal signal representing 1 is +1.0, while an ideal signal representing 0 would be −1.0 and, in a typical channel, which has impairments, interference and noise, the normalized output may take on any value therebetween.

In an unbiased decision, if an output $z>0$ then the process declares 1, and, if the output $z<0$ then the process declares the output=0. In a biased decision, if the output $z>X$ then declare 1, otherwise declare 0. X is identified as the threshold value and is selected based on the analysis. If it is desired to favor the output 1, then X will be negative; e.g., a small negative number; e.g., minus 0.1, etc.

Employing the above process, normalizing the output and deriving the optimum threshold can be delicate and complex to implement and is subject to degradations due to tolerances in the implementation.

SUMMARY

A method and apparatus for providing biasing criteria for binary decisions for use in wireless communications to enhance protection is disclosed.

In accordance with the present invention a criterion is utilized which makes the decision much simpler and more reliable in application, which criteria is significantly more reliable than the simple X threshold.

In accordance with this criteria, for time division duplex (TDD), the criteria is based on the measured signal to interference ratio (SIR), which is derived from the channel estimation process. It can be shown that virtually all instances of error occur when the SIR value is low.

Correlation between failures, or near failures of the radio modulation (RM) decoder and errors in the other bits of the transmission is high; therefore, the criterion of the present invention is highly reliable and can be easily implemented.

DETAILED DESCRIPTION

Figure 1:
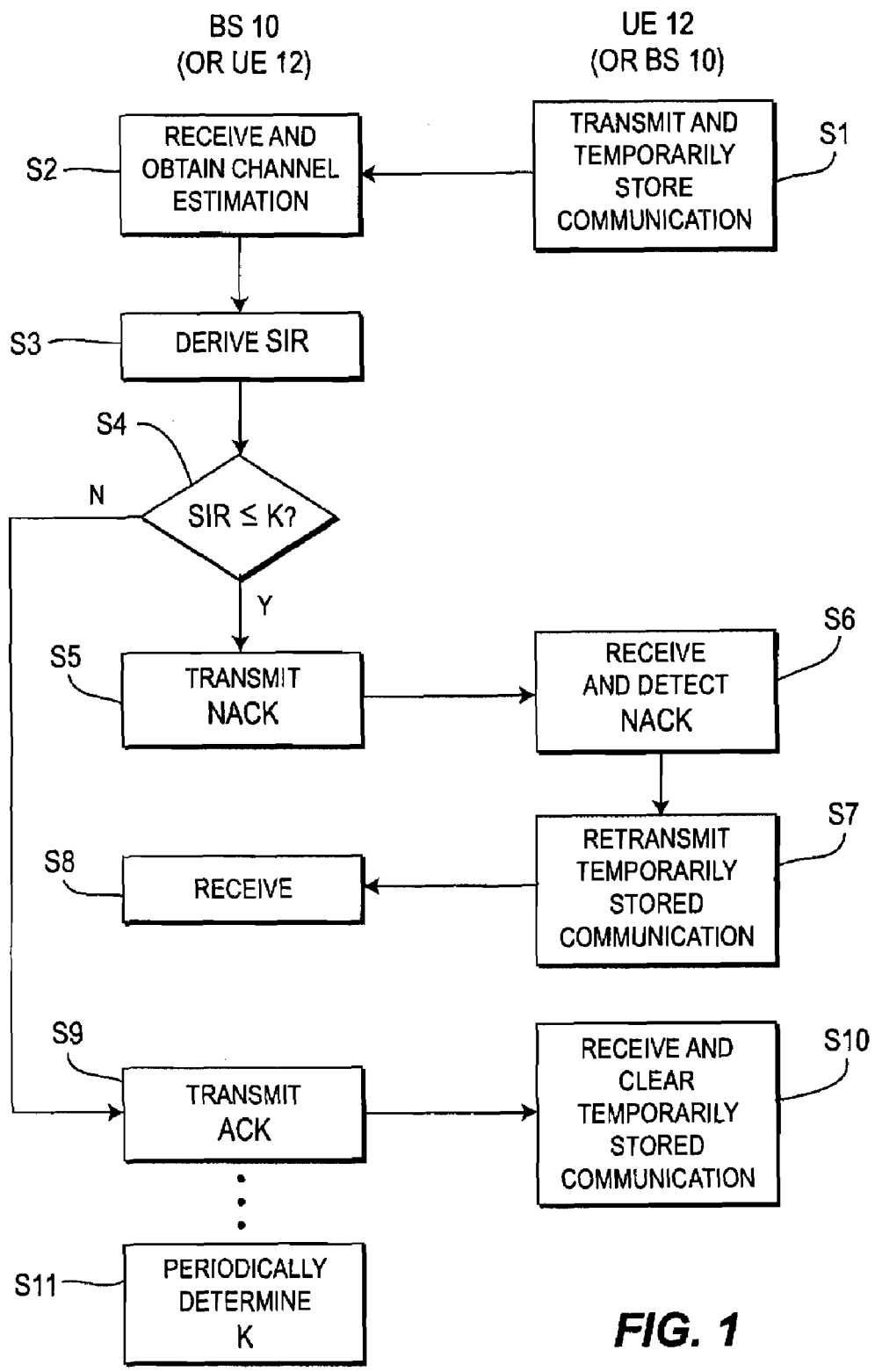
FIG. 1 is a diagrammatic representation of apparatus for practicing the novel methods of the present invention.

FIG. 1 shows a routine utilized to practice the technique of the present invention. In the example shown, which is a downlink example, a device such as a base station (BS10), based on a communication from UE12, provided at step S1, utilizes this communication to obtain channel estimation, at step S2.

The BS10 derives a signal to interference ratio (SIR), from the channel estimation, at step S3 using well known techniques. At step S4 BS10 compares the SIR obtained at step S3 with a given threshold.

The threshold may be determined by employing any one of a variety of different techniques. One technique which may be used is to determine, through a combination of analysis, aided by simulation, and actual testing, with a test set-up. Test signals plus noise are input to the test set-up and output signals are examined. The output signals are measured and the correctness of the binary decision is also determined. This test is repeated over an entire range of useful signals, including very low signals. For each amplitude level, the number of instances of correct decisions and incorrect decisions are stored. Generally, strong signals are associated with very high frequency of correct decisions and weak signals are associated with high instances of incorrect decisions. The threshold is preferably greater than the level of noise taken alone.

Since the objective is to avoid one particular type of error; e.g. probability of declaring an ACK, given that a NACK was sent, the threshold is selected i.e., biased, so that, when signals are above the threshold, there is an acceptably low frequency of errors and when signals fall below this threshold there is an unacceptable frequency of occurrence of errors. Since the objective is to avoid false declarations of ACK, any decision that occurs with a signal below the threshold is declared as a NACK. More generally, when the signal is below the threshold the binary decision is thus biased to be the choice that causes the least catastrophic result, even if in error. This technique may be performed either off-line or periodically by the BS10 (or UE12), as shown by step S11. Also, if desired other techniques may be used to obtain a threshold value.

If the SIR is less than the threshold, BS10, at step S5, transmits a NACK signal to UE12. UE12, at step S6 receives and detects the NACK signal and, at step S7 retransmits the temporarily stored communication received by BS10 at step S8.

Returning step S4, assuming that the SIR is greater than the threshold value, the routine branches to Step S9 to transmit an ACK signal. The UE12 at step S10 receives the ACK signal and clears the communication temporarily stored at step S1.

It should be understood that the routine shown in FIG. 1 is equally applicable to uplink wherein the functions performed by the BS10 and UE12 are reversed, and it is the BS10 that transmits and temporarily stores a communication at step S1. The UE12 obtains channel estimation at step S2, derives the SIR, at step S3, compares the SIR derived with a given threshold, at step S4, and transmits a NACK to the BS at step S5. BS10, receiving the NACK and retransmits the temporarily stored communication at steps S6 and S7 respectively, the retransmitted communication being received by the UE12 at step S8. In the event that the SIR is greater than the threshold setting, the UE transmits an ACK condition at S9, which is received by the BS10 at step S10 whereby the ACK signal causes the BS10 to clear the temporarily stored communication.

It should be understood that the technique of the present invention may also be used simultaneously in both uplink and downlink communications between a UE and a BS.

What is claimed is:

1. A method for use by a wireless unit and employing criteria for biasing a binary decision by adjustment of a threshold used for the binary decision to provide unequal protection of a received communication, comprising the steps of:
   receiving the communication in a given channel;
   obtaining a signal to interference ratio (SIR) of the communication channel;
   comparing the SIR against the threshold, said threshold being adjusted based on criteria including at least a noise component and being selected to bias the binary decision toward a determination that a received data communication is interpreted as having an error; and
   generating one of a non-acknowledgement (NACK) or an acknowledgement (ACK) based only on the result of the comparison of the SIR with the threshold; wherein
   the determination of the received communication as having no error being responsive to said SIR being greater than said threshold and independent of and eliminating a need for an error detection operation on the received communication which is accepted by the wireless unit.

2. A method for use by a wireless unit and employing criteria for biasing a binary decision by adjustment of a threshold used for the binary decision to provide unequal protection of a received communication, comprising the steps of:
   receiving the communication in a given channel;
   obtaining a signal to interference ratio (SIR) of the communication channel;
   comparing the SIR against the threshold, said threshold being adjusted based on criteria including at least a noise component and being selected to bias the binary decision toward a determination that a received data communication is interpreted as having an error; and
   generating one of a non-acknowledgement (NACK) or an acknowledgement (ACK) based only on the result of the comparison of the SIR with the threshold;
   wherein criteria for biasing the binary decision comprises:
   combining, with noise, each of a plurality of test signals having signal strengths extending over a given range;
   determining correctness of each combined signal;
   determining instances of correct signals and incorrect signals at each signal strength; and
   selecting a threshold which provides an acceptable number of false declarations of an ACK condition.

3. The method of claim 2 wherein said SIR is obtained by initially obtaining a channel estimation of said given channel and deriving the SIR from the channel estimation.

4. The method of claim 2 wherein signal amplitude is employed as a measure of signal strength.

5. The method of claim 2 wherein the threshold is greater than a level of the noise taken alone.

6. The method of claim 2 further comprising:
   setting the threshold at a level that is low enough so that an acceptable low frequency of errors occurs for SIRs above the threshold and high enough to prevent an unacceptable high number of errors for SIRs below the threshold.

7. The method of claim 2 wherein the channel estimation is based on a communication received from a sender.

8. Apparatus for a wireless unit employing criteria for biasing a binary decision providing unequal protection of a received communication, comprising:
   a receiver configured to receive the communication in a given channel;
   a unit configured to obtain a signal to interference ratio (SIR) of the communication channel; and
   a comparison unit configured to compare the SIR against a given threshold;
   a unit configured to set said threshold based on certain criteria, including at least a noise component, so that said threshold level is increased to bias the binary decision toward providing a determination that the received communication contains an error; said comparison unit generating one of a non-acknowledgement (NACK) or an acknowledgement (ACK) based only on the result of the comparison of the SIR with the threshold; wherein
   a determination that the received communication should be retransmitted is obtained by setting the threshold so that it is at least greater than said noise component and independent of and without need for performing an error detection operation on the received communication and a determination that the received communication is accepted and does not have to be retransmitted is obtained when the SIR is greater than the threshold.

9. Apparatus for a wireless unit employing criteria for biasing a binary decision providing unequal protection of a received communication, comprising:
   a receiver configured to receive the communication in a given channel;
   a unit configured to obtain a signal to interference ratio (SIR) of the communication channel; and
   a comparison unit configured to compare the SIR against a given threshold;
   a unit configured to set said threshold based on certain criteria, including at least a noise component, so that said threshold level is increased to bias the binary decision toward providing a determination that the received communication contains an error; said comparison unit generating one of a non-acknowledgement (NACK) or an acknowledgement (ACK) based only on the result of the comparison of the SIR with the threshold;
   said unit for setting the threshold further comprising:
   a unit configured to set the threshold by combining, with noise, each of a plurality of test signals having signal strengths extending over a given range;
   a unit configured to determine correctness of each combined signal;
   a unit configured to determine instances of correct signals and incorrect signals at each signal strength; and a unit configured to select the threshold to provide an acceptable number of false declarations of an ACK condition.

10. The apparatus of claim 9 wherein said SIR is obtained by a unit for initially obtaining a channel estimation, said unit for obtaining the SIR generating the SIR based on the channel estimation.

11. The apparatus of claim 9 wherein the unit for combining is configured to use signal amplitude as a measure of signal strength.

12. The apparatus of claim 9 wherein the threshold is set so as to be greater than a signal strength of the noise component taken alone.

13. The apparatus of claim 9 wherein the unit for initially obtaining the channel estimation is configured to obtain the channel estimation based on a communication from a sender.

* * * * *